United States Patent
Hisamitsu et al.

(10) Patent No.: US 6,833,885 B2
(45) Date of Patent: Dec. 21, 2004

(54) TWO LAYER LIQUID CRYSTAL DISPLAY APPARATUS

(75) Inventors: Akihito Hisamitsu, Mishima-gun (JP); Noboru Ueda, Hachioji (JP); Nobuyuki Kobayashi, Kobe (JP); Hideaki Ueda, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 42 days.

(21) Appl. No.: 10/105,182

(22) Filed: Mar. 25, 2002

(65) Prior Publication Data

US 2002/0176041 A1 Nov. 28, 2002

(30) Foreign Application Priority Data

Mar. 28, 2001 (JP) ........................................ 2001-093907

(51) Int. Cl.⁷ .............................................. G02F 1/1347
(52) U.S. Cl. ........................... 349/74; 349/115; 349/185
(58) Field of Search .......................... 349/74, 115, 185, 349/186, 78, 184

(56) References Cited

U.S. PATENT DOCUMENTS

| | | | |
|---|---|---|---|
| 3,836,230 A | * 9/1974 | Adams et al. | 349/176 |
| 5,493,430 A | 2/1996 | Lu et al. | 359/68 |
| 5,841,492 A | * 11/1998 | Iwauchi et al. | 349/74 |
| 5,847,798 A | 12/1998 | Yang et al. | 349/169 |
| 6,580,482 B1 | * 6/2003 | Hiji et al. | 349/115 |
| 6,597,419 B1 | * 7/2003 | Okada et al. | 349/104 |

* cited by examiner

*Primary Examiner*—Tarifur R. Chowdhury
*Assistant Examiner*—Prasad R Akkapeddi
(74) *Attorney, Agent, or Firm*—Sidley Austin Brown & Wood LLP

(57) ABSTRACT

A liquid crystal display apparatus includes a first liquid crystal layer having first liquid crystal exhibiting a cholesteric phase at a room temperature, and being tuned to selectively reflect light of a wavelength λ1 within a visible wavelength range; and a second liquid crystal layer disposed on the first liquid crystal layer, having second liquid crystal exhibiting a cholesteric phase at the room temperature, and being tuned to selectively reflect light of a wavelength λ2 within the visible wavelength range, wherein a difference between the selective reflection wavelengths λ1 and λ2 is in a range from 100 nm to 150 nm.

20 Claims, 5 Drawing Sheets

TWO LAYER LIQUID CRYSTAL DISPLAY APPARATUS

CROSS-REFERENCE TO RELATED APPLICATION

This application is based on Japanese patent application No. 2001-93907 filed in Japan on Mar. 28, 2001, the entire content of which is hereby incorporated by reference.

BACKGROUND OF THE INVENTION

1. Field of the Invention

The present invention relates to a liquid crystal display apparatus, and particularly to a liquid crystal display apparatus of a reflection type including liquid crystals, which can selectively reflect light of specific wavelengths in visible light at a room temperature.

2. Description of Related Art

A liquid crystal display apparatus basically has a pair of substrates and a liquid crystal layer held between the substrates. By applying a drive voltage to the liquid crystal layer, orientation of liquid crystal molecules is controlled to modulate external light incident to the liquid crystal layer so that images or the like can be displayed in an intended manner.

Various manners have been proposed for display by the liquid crystal.

In recent years, research has been conducted on a liquid crystal display apparatus using chiral nematic liquid crystal, which is prepared by adding a chiral material to a nematic liquid crystal, and exhibits a cholesteric liquid crystal phase at a room temperature.

It is already known that the liquid crystal display apparatus of the above type can be used as a liquid crystal display apparatus of a reflection type, which utilizes a selective reflectivity of the chiral nematic liquid crystal, and can be driven with a low power consumption.

In this liquid crystal display apparatus of the reflection type, high and low pulse voltages can be selectively applied to switch the liquid crystal between a planar state (colored state) and a focal conic state (transparent state).

Even after the application of such pulse voltages is stopped, the region, which was switched to the planar state, keeps the planar state, and the region, which was switched to the focal conic state, keeps the focal conic state. Thus, a bistability or memory property is exhibited, and thereby the display is maintained even after the stop of application of the voltages.

However, the conventional liquid crystal display apparatus of the reflection type using the chiral nematic liquid crystal cannot yet perform the image display with a sufficiently high reflectance, and therefore cannot achieve sufficiently high contrast between the planar state and the focal conic state.

Further, the conventional liquid crystal display apparatus of the reflection type using the chiral nematic liquid crystal cannot sufficiently perform the display in white because the apparatus basically utilizes the selective reflection characteristics of the visible light.

SUMMARY OF THE INVENTION

An object of the invention is to provide a liquid crystal display apparatus of a reflection type, which can display images with high contrast while achieving a good light reflectance in a monochrome display operation.

Another object of the invention is to provide a liquid crystal display apparatus of a reflection type, which can be driven with a low voltage.

Still another object of the invention is to provide a liquid crystal display apparatus of a reflection type, in which a dependence on a viewing angle can be small.

The invention provides a liquid crystal display apparatus including:

a first liquid crystal layer including first liquid crystal exhibiting a cholesteric phase at a room temperature, and being tuned to selectively reflect light of a wavelength $\lambda 1$ within a visible wavelength range; and a second liquid crystal layer disposed on the first liquid crystal layer, including second liquid crystal exhibiting a cholesteric phase at the room temperature, and being tuned to selectively reflect light of a wavelength $\lambda 2$ within the visible wavelength range, wherein a difference between the selective reflection wavelengths $\lambda 1$ and $\lambda 2$ is in a range from 100 nm to 150 nm.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
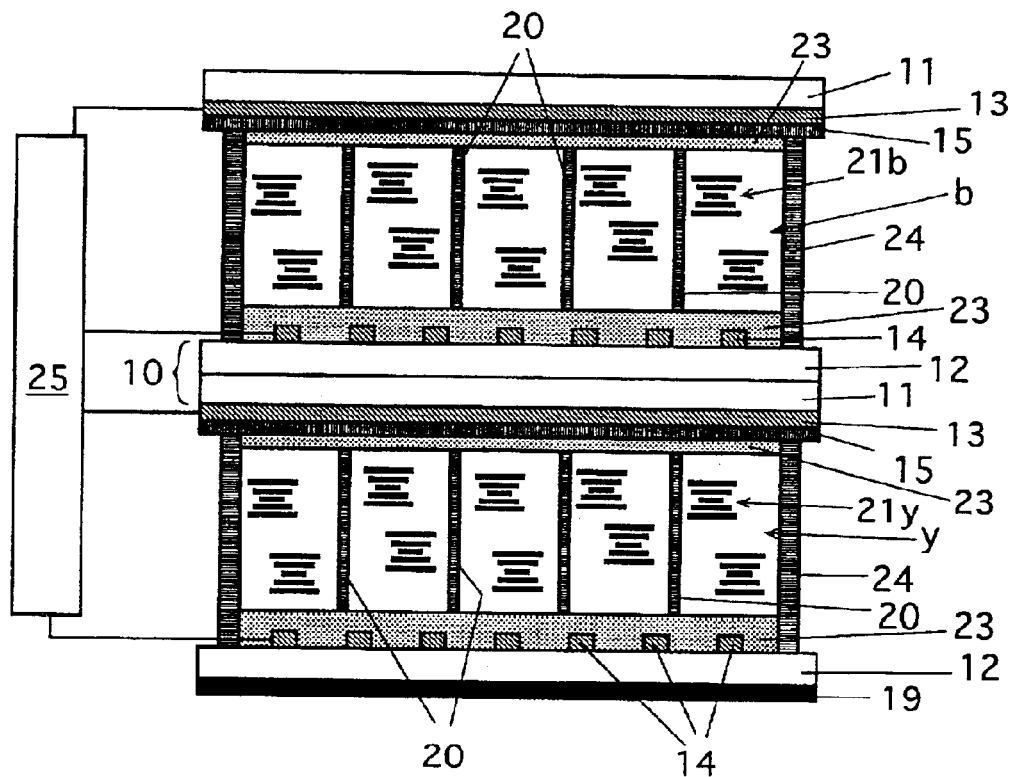
FIG. 1(A) is a schematic cross section showing an example of a liquid crystal display apparatus of a reflection type with liquid crystals kept in a planar state.

A liquid crystal display apparatus of a preferred embodiment of the invention basically includes a pair of substrates including at least one transparent substrate, and each provided with an electrode, first and second liquid crystal layers held between the pair of substrates, the first liquid crystal layer including first liquid crystal exhibiting a cholesteric phase at a room temperature and being tuned to selectively reflect light of a wavelength $\lambda 1$ within a visible wavelength range, and the second liquid crystal layer arranged on the first liquid crystal layer, and including second liquid crystal exhibiting a cholesteric phase at the room temperature and being tuned to selectively reflect light of a wavelength $\lambda 2$ within the visible wavelength range; and an intermediate transparent substrate arranged between the first and second liquid crystal layers, wherein a difference between the selective reflection wavelengths $\lambda 1$ and $\lambda 2$ is in a range from 100 nm to 150 nm.

Each of the selective reflection wavelengths $\lambda 1$ and $\lambda 2$ is typically the peak reflection wavelength of the selective reflection of the respective liquid crystal layer.

The intermediate transparent substrate in the display apparatus may be (a) an intermediate transparent substrate provided on its opposite surfaces with transparent electrodes, respectively, (b) an intermediate transparent substrate formed of layered transparent substrate portions, each of which is provided on one of its surfaces with a transparent electrode, and has the other surface attached to the other substrate portion, or (c) an intermediate transparent substrate not provided with an electrode.

According to the liquid crystal display apparatus of the reflection type, the first and second liquid crystal layers, between which the intermediate substrate is interposed, are held between the paired substrates, and the difference between the selective reflection wavelengths $\lambda 1$ and $\lambda 2$ of the first and second liquid crystal layers (more precisely, the first liquid crystal included in the first liquid crystal layer and the second liquid crystal included in the second liquid crystal layer) is set to fall within the range from 100 nm to 150 nm. In other words, the display apparatus is configured such that the difference ranging from 100 nm to 150 nm is present between the selective reflection wavelength $\lambda 1$ and $\lambda 2$ when the first and second liquid crystal layers are in the planar state. Thereby, good white display (whitish display) and the good light reflectance can be achieved, the display contrast of the display apparatus is improved, and a dependency on a viewing angle can be reduced to a practically allowed degree. The above display apparatus can be configured operate with a low voltage.

If the difference between the selective reflection wavelengths were smaller than 100 nm, a color at and around an average between the two wavelengths $\lambda 1$ and $\lambda 2$ would appear excessively. If the difference between the selective reflection wavelengths were larger than 150 nm, a color complementary to a color at and around an average between the two wavelengths $\lambda 1$ and $\lambda 2$ would appear excessively. These situations are not preferable.

More preferably, the difference between the two selective reflection wavelengths $\lambda 1$ and $\lambda 2$ ranges from 110 nm to 120 nm.

For example, the selective reflection wavelength $\lambda 1$ is in a range from 450 nm to 500 nm, and the selective reflection wavelength $\lambda 2$ is in a range from 550 nm to 650 nm. The wavelengths $\lambda 1$ and $\lambda 2$ in these ranges can achieve good color balance and substantially white or whitish display. As a typical example, the selective reflection wavelength $\lambda 1$ is substantially equal to 480 nm, and the selective reflection wavelength $\lambda 2$ is substantially equal to 590 nm.

In any one of the above structures, the liquid crystal display apparatus of the reflection type may further include a drive device for applying drive voltages to the first and second liquid crystal layers such that the first and second liquid crystal layers exhibit substantially an equal peak reflectance in the same pixel, or a ratio between peak reflectances of the first and second liquid crystal layers is substantially constant in the same pixel.

As described above, when the first and second liquid crystal layers are driven such that, in the same pixel, the peak reflectances of the first and second liquid crystal layers are substantially equal to each other, or the peak reflectance ratio between the first and second liquid crystal layers is substantially constant (thus, the peak reflectances of the first and second liquid crystal layers may increase and decrease while keeping a constant ratio), the monochrome display characteristics can be further improved.

The liquid crystal display apparatus of the reflection type may include a drive device for applying drive voltages to said first and second liquid crystal layers such that the drive voltages supplied to said first and second liquid crystal layers in the same pixel by the drive device substantially equal to each other.

As described above, by applying substantially the same drive voltages to the first and second liquid crystal layers, the drive device can employ a simple circuit structure, and thus the liquid crystal display apparatus of the reflection type can be inexpensive.

In any one of the above structures, each of the first liquid crystal included in the first liquid crystal layer and the second liquid crystal included in the second liquid crystal layer may be a chiral nematic liquid crystal composition including a mixture of nematic liquid crystal and a chiral material. The chiral nematic liquid crystal composition has such an advantage that the selective reflection wavelength can be controlled by changing an amount of the chiral material (chiral dopant) to be mixed.

If the amount of chiral material to be added or mixed is excessively small in amount, the chiral nematic liquid crystal composition cannot have sufficient memory property. If it is excessively large in amount, the chiral nematic liquid crystal composition may not exhibit the cholesteric phase or is solidified at a room temperature. Accordingly, the amount of chiral material in each of the first liquid crystal and second liquid crystal may be preferably in a range from 8% to 40% by weight with respect to the whole weight of the chiral nematic liquid crystal composition.

Two or more kinds of chiral materials may be added to control physical properties such as temperature characteristics. Thereby, either or each of the first and second chiral nematic liquid crystal compositions, may contain two or more kinds of chiral materials.

In any one of the above structures, the liquid crystal in the liquid crystal layer preferably has a refractive index anisotropy ($\Delta n$) equal to or larger than 0.15. The refractive index anisotropy of the liquid crystal equal to or larger than 0.15 can expand a wavelength range, in which the reflectance peak of liquid crystal layer is exhibited, and therefore can achieve more whitish display.

At least one of the first and second liquid crystal layers may contain a dye for improving black display characteristics and others.

The dye to be added may be selected from various known kinds of dyes, and is preferably selected from dyes exhibiting a good compatibility with liquid crystal. For example, dyes made of azo compounds, quinone compounds, anthraquinone compounds or the like may be used, and also dichromatic dyes or the like can be used. Two or more kinds of dyes selected from the above dyes may be used. The amount of the added dye(s) is desirably at most 3% by weight with respect to the total amount of the nematic liquid crystal and the chiral material. If the amount is excessively large, the selective reflection rate of the liquid crystal lowers, resulting in low contrast.

Instead of addition of the dye(s) to the liquid crystal layer, a color filter may be employed. In this case, the liquid crystal display apparatus may be provided with, e.g., a filter layer. The filter layer may be made of, e.g., a colorless transparent material and dye(s) added thereto, or may be an originally colored material without requiring addition of dye. For example, the filter layer may be formed of a thin film made of a specific material serving similarly to dye (s). The substrate itself forming the liquid crystal display apparatus may be made of the filter layer material described above, whereby a similar effect can be achieved.

Orientation stabilizing films, which are in contact with the liquid crystal layer(s), may be formed on at least one of the paired substrates as well as on at least one surface of the intermediate substrate.

Provision of the orientation stabilizing film achieves a strong interaction between the liquid crystal and the orientation stabilizing film, and achieves uniform orientation of the liquid crystal molecules so that the reflectance in the planar state increases, and scattering in the focal conic state is suppressed. These improve the contrast of the liquid crystal display apparatus. The orientation stabilizing film may be subjected to orientation processing such as rubbing, but the dependence on the viewing angle of the apparatus can be small if the orientation processing such as rubbing is not performed.

In any one of the above structures, each of the liquid crystal layers may have a thickness in a range from 3 μm to 10 μm so that the drive voltage can be low, and the quality of monochrome display can be improved.

At least one of the paired substrates may be a resin substrate. The intermediate substrate may be a resin substrate. By employing the resin substrate, the liquid crystal display apparatus can have a light and thin structure. The resin substrate may be flexible, whereby the liquid crystal display apparatus can perform display on a curved surface.

Specific examples of the liquid crystal display apparatus of the reflection type will now be described with reference to the drawings.

Figure 1B:
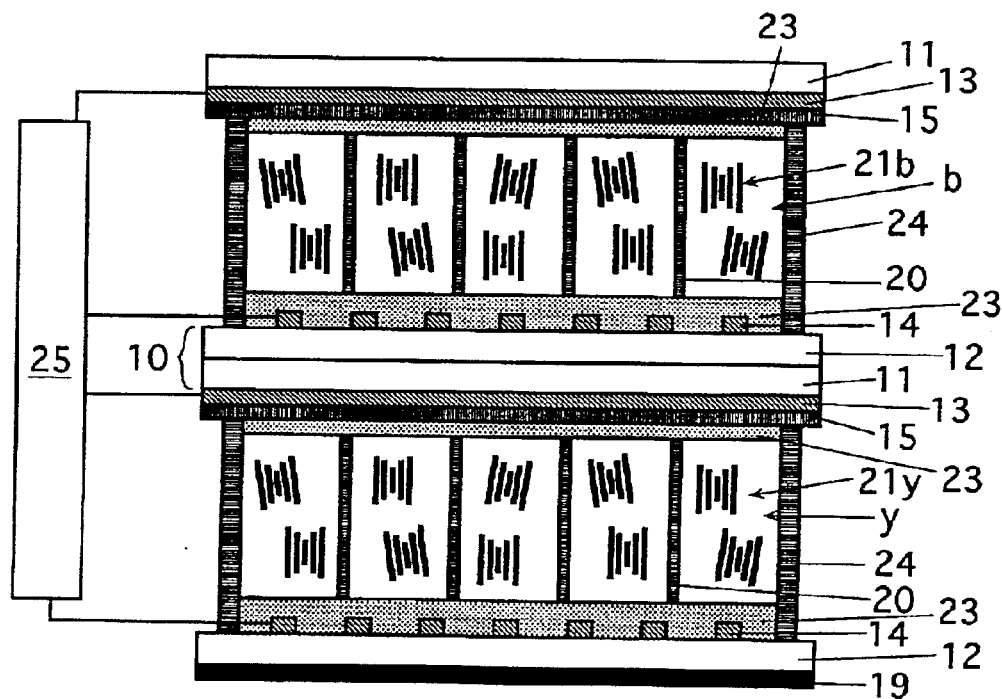
FIG. 1(B) is a schematic cross section of the liquid crystal display apparatus of the reflection type with the liquid crystals kept in a focal conic state.

FIGS. 1(A) and 1(B) are schematic views showing a sectional structure of an example of the liquid crystal display apparatus of the reflection type. FIG. 1(A) shows the liquid crystal display apparatus in a planar state (including the first and second liquid crystal layers in a colored state) after applying a pulse voltage of a relatively high energy. FIG. 1(B) shows the liquid crystal display apparatus in a focal conic state (including the first and second liquid crystal layers in a transparent state, and exhibiting a black appearance as a whole) after applying a pulse voltage of a relatively low energy. This liquid crystal display apparatus has memory properties so that the planar state and the focal conic state are maintained after application of the pulse voltage.

The first and second liquid crystal layers have specific selective reflection wavelengths λ1 and λ2 in a visible light range, respectively, and a difference between λ1 and λ2 is in a range from 100 nm to 150 nm.

[Whole Structure of the Display Apparatus]

The liquid crystal display apparatus shown in FIGS. 1(A) and 1(B) includes a Y-liquid crystal layer y (layer for yellow display), which contains a liquid crystal composition 21y having a selective reflection wavelength λ1 in a range from 550 nm to 650 nm, and a B-liquid crystal layer b (layer for blue display), which contains a liquid crystal composition 21b having a selective reflection wavelength λ2 in a range from 450 nm to 500 nm.

In the liquid crystal display apparatus shown in FIGS. 1(A) and 1(B), portions having basically the same structures and operations bear the same reference numbers.

Each of the liquid crystal layers y and b shown in FIGS. 1(A) and 1(B) is held between a pair of substrates 11 and 12, each of which has a light transparency, and is made of a transparent substrate. Each of the transparent substrates 11 and 12 is provided on its surface with a plurality of transparent belt-like electrodes 13 or 14, which are parallel to each other. In a plan view, the electrodes 13 cross the electrodes 14. The electrodes are preferably coated with insulating thin films. In this example, the electrode 13 is coated with an insulating thin film 15. An orientation stabilizing film 23 is formed on each of the insulating film 15 and the lower electrodes 14. If required, a visible light absorbing layer is formed on an outer surface (rear surface) of the substrate opposite to the light incident side. In this example, a visible light absorbing layer 19 is arranged on the rear surface of the substrate 12 of the Y-liquid crystal layer y having the selective reflection wavelength ranging from 550 nm to 650 nm.

The substrates 11 and 12 between the liquid crystal layers y and b are layered together so that the surfaces not bearing the electrode are joined together, and both form an intermediate transparent substrate 10.

A reference "20" indicates a columnar structure serving as a space holding member. The liquid crystal compositions 21y and 21b are chiral nematic liquid crystal compositions exhibiting the cholesteric phase at a room temperature. Materials and combinations of them will be described more specifically later. A reference "24" indicates a sealing member for keeping the liquid crystal compositions 21y and 21b between the substrates 11 and 12.

A reference "25" indicates a drive device for applying a predetermined pulse-like voltage to the electrodes 13 and 14.

[Substrate]

As already described, both the substrates 11 and 12 have the light transparency, but the substrate 12 provided with the light absorbing layer 19 may not be transparent, or may also serve as a light absorbing layer. The substrate having the light transparency may be a glass substrate. Instead of the glass substrate, the apparatus may employ flexible resin substrates made of, e.g., polycarbonate (PC), polyether sulfone (PES), polyarylate (PAR) or polyethylene terephthalate (PET).

[Electrode]

The electrode may be formed of, e.g., a transparent and electrically conductive film made of ITO (Indium Tin Oxide), IZO (Indium Zinc Oxide) or the like, a metal film made of aluminum or silicon, or a photoconductive film made of amorphous silicon or BSO (Bismuth Silicon Oxide).

In the liquid crystal display apparatus shown in FIGS. 1(A) and 1(B), as already described, the plurality of belt-like transparent electrodes 13 and 14 are formed on the surfaces of transparent substrates 11 and 12, and the electrodes 13 extend across the electrodes 14 in a plan view.

For example, the above electrodes can be formed as follows. An ITO film is formed on the transparent substrate by mask pattern deposition in a sputtering method, or the ITO film is formed on the whole surface, and then is patterned by photolithography.

[Insulating Thin Film]

In the liquid crystal display apparatus shown in FIGS. 1(A) and 1(B) as well as other liquid crystal display apparatuses of the embodiments of the invention, an insulating thin film may be employed for preventing short-circuit between the electrodes and/or for serving as a gas barrier layer capable of improving the reliability of the liquid crystal display apparatus. As already described, an insulting thin film 15 is arranged by coating over the electrodes 13.

The insulating thin film may be made of an inorganic material such as silicon oxide, titanium oxide, zirconium oxide, its alkoxide or the like, or may be an organic film made of polyimide resin, acrylic resin, urethane resin or the like.

By using these materials, the insulating thin film can be formed in a known method such as vapor deposition, spin coating or roll coating.

The insulating thin film may contain dye(s) added to the foregoing material so that the film can function as a color filter. Further, the insulating thin film may be made of the same high polymer resin as columnar structures, which will be described later.

[Orientation Stabilizing Film]

The orientation stabilizing film may be an organic film made of polyimide resin, polyamide-imide resin, polyether-imide resin, polyvinyl butyral resin, acrylic resin or the like, or may be made of an inorganic material such as silicon oxide, aluminum oxide or the like. The orientation stabilizing film made of the above material does not require rubbing processing. The orientation stabilizing film may be configured to serve also as the insulating thin film.

Provision of the orientation stabilizing film improves the orientation characteristics of the liquid crystal, the reflectance in the colored state and the responsibility of the liquid crystal.

[Spacer]

In the liquid crystal display apparatus shown in FIGS. 1(A) and 1(B) as well as other liquid crystal display apparatuses of the embodiments of the invention, spacers may be arranged between the paired substrates for keeping a uniform gap between the substrates. Although not shown in FIGS. 1(A) and 1(B), spacers are interposed between the paired substrates 11 and 12 in the liquid crystal display apparatus of this embodiment.

The spacers may be spheres made of resin or inorganic oxide. Spacers coated with thermoplastic resin may be appropriately used. Although the spacers and the columnar structures are employed in this example, the columnar structure may be eliminated, and the spacers may be used also as space holding members.

[Liquid Crystal Composition]

The liquid crystal composition included in the liquid crystal layer is preferably a chiral nematic liquid crystal composition, which includes a nematic liquid crystal component having a refractive index anisotropy of 0.15 or higher, and a chiral material at a rate of 8%–40% by weight. A larger refractive index anisotropy causes scattering of light to a higher extent so that broad reflection characteristics are exhibited, and the reflectance increases to achieve better white display. The selective reflection wavelength can be tuned or controlled in accordance with an amount of the added chiral material. A larger amount of chiral material increases a viscosity. This lowers the responsibility (response ability), and increases the required drive voltage. However, an excessively small amount cannot achieve an intended selective reflection wavelength.

The above addition rate of the chiral material is determined with respect to the total amount of the nematic liquid crystal component and the chiral material expressed by 100% by weight.

[Columnar Structure]

In the liquid crystal display apparatus shown in FIGS. 1(A) and 1(B) as well as other liquid crystal display apparatuses of the embodiments of the invention, the paired substrates may be supported by a structure for achieving strong self-holding characteristics. In the liquid crystal display apparatus shown in FIGS. 1(A) and 1(B), columnar structures 20 are arranged between the substrates 11 and 12, and are connected thereto. The columnar structures may be connected to only one of the substrates, and may not be connected to the other substrate.

The columnar structures are configured as follows. The columnar structures may be arranged in accordance with a predetermined pattern such as a grid-like pattern with a uniform space therebetween, and each may have a circular, square or elliptic section, or a trapezoidal or conical form. The columnar structures may have a stripe-like form, and are spaced by a predetermined distance from each other. Preferably, the columnar structures are not arranged in random, but may be spaced from each other by a constant distance, a gradually changing distances or a variable distance to provide predetermined repetitive patterns so that the distance between the substrates can be appropriately held without impeding the image display. For achieving practically satisfied characteristics of the liquid crystal display apparatus, it is preferable that the columnar structures occupy 1%–40% of the area of the display region of the liquid crystal display apparatus.

A material of the columnar structure will now be described.

The columnar structure may be made of, e.g., a polymer composition containing polymerizable monomer and polymerization initiator.

The polymer composition may be a commercially available photo-curable resin material, which is, e.g., liquid mixture of a photo-curable monomer or oligomer and the photo-polymerization initiator. By irradiating the photo-curable resin material with light, the columnar structures having a predetermined form and spaced by a predetermined distance can be easily formed.

A particularly preferable material of the columnar structures is that primarily containing an acrylic ester compound. The acrylic ester can be an acrylate or methacrylate compound having two or more allyl groups. On a main chain between the allyl groups, the compound may include a structure of an aromatic ring or the like, and may include a divalent group such as $CO$, $CO_2$, $CH_2$, $O$ or the like. The acrylate compound includes an epoxy acrylate compound, urethane acrylate compound and others. Other thermoplastic resins or thermosetting resins may be used.

The columnar structures may be formed in various manners. Description will now be given on the manner of forming the columnar structures using photo-curing resin.

First, an ultraviolet-curing material (i.e., composition for forming the columnar structures) is held between the substrate provided with the ITO electrodes and a mask provided with a predetermined pattern, and is irradiated with ultraviolet rays. Alternatively, an ultraviolet-curing material is applied over a surface of the substrate carrying the electrodes and others, and is irradiated with ultraviolet rays after being masked. Then, the mask is removed, the material is removed from unexposed portions with a predetermined solvent, and drying and curing are performed to complete the columnar structures.

Alternatively, a mixture of the liquid crystal material and the photo-curing resin material may be held between glass substrates, and may be irradiated with light after placing a photo-mask on the glass substrate. Thereby, the polymerization phase isolation takes place to form the columnar structures.

For completing the liquid crystal display apparatus after forming the columnar structures, a vacuum supply method or the like may be employed for supplying the liquid crystal composition into the space between the substrates, which hold the columnar structures therebetween. Alternatively, droplets of the liquid crystal composition may be applied before joining the substrates together so that the liquid crystal composition may be sealedly held simultaneously with the joining of the substrates.

For controlling a gap between the substrates with improved precision, the columnar structures may be formed while arranging spacer materials, which are smaller in size than the thickness(height) of the columnar structures, and are formed of glass fibers, ball-like powder of glass or ceramics, or spherical particles of an organic material. These spacer materials prevent the change in gap due to a heat and/or a pressure so that the gap precision can be improved, and thereby disadvantages such as irregularities in the applied voltage and display can be suppressed.

For example, the screen printing method is executed as follows for forming the columnar structures. First, a screen provided with a predetermined pattern is arranged on one or each of the substrates provided with the electrodes and others, and a printing material (composition such as photo-curing resin for forming the columnar structures) is placed on the screen. A squeegee is moved with predetermined pressure, angle and speed. Thereby, the printing material is transferred onto the substrate through the pattern of the screen. Then, the transferred material is solidified and dried.

For forming the columnar structures in the screen printing method, resin materials other than the photo-curing resin already described may be employed. For example, epoxy resin, acrylic resin or like thermosetting resins or thermoplastic resins can be used. Examples of the thermoplastic resins are polyvinyl chloride resin, polyvinylidene chloride resin, polyvinyl acetate resin, polymethacrylate ester resin, polyacrylate ester resin, polystyrene resin, polyamide resin, polyethylene resin, polypropylene resin, fluorine-containing resin, polyurethane resin, polyacrylonitrile resin, polyvinyl ether resin, polyvinyl ketone resin, polyether resin, polyvinyl pyrrolidone resin, saturated polyester resin, polycarbonate resin, chlorinated polyether resin or the like. It is desired that the resin material is dissolved in a proper solvent to form paste before it is used.

In the case where the columnar structures made of a thermosetting resin material or a thermoplastic resin material is used, and the spacers are arranged between the paired substrates, the liquid crystal display apparatus can be produced e.g., as follows.

First, the resin material is arranged on at least one of the substrates, and then the spacers are dispersed on at least one of the substrates. Then, the paired substrates are overlaid together such that the surfaces bearing the belt-like electrodes are opposed to each other. A pressure is applied to opposite surfaces of the pair of overlaid substrates while heating them. Thereby, the resin material is softened, and then is cooled to solidify it again to form empty cells.

For completing the liquid crystal display apparatus, the liquid crystal composition is supplied into the space between the substrates holding the columnar structures therebetween, e.g., in the vacuum supply method.

Droplets of the liquid crystal composition may be applied before joining the substrates, and the liquid crystal composition may be sealedly held simultaneously with the joining of the substrates.

Figure 2:
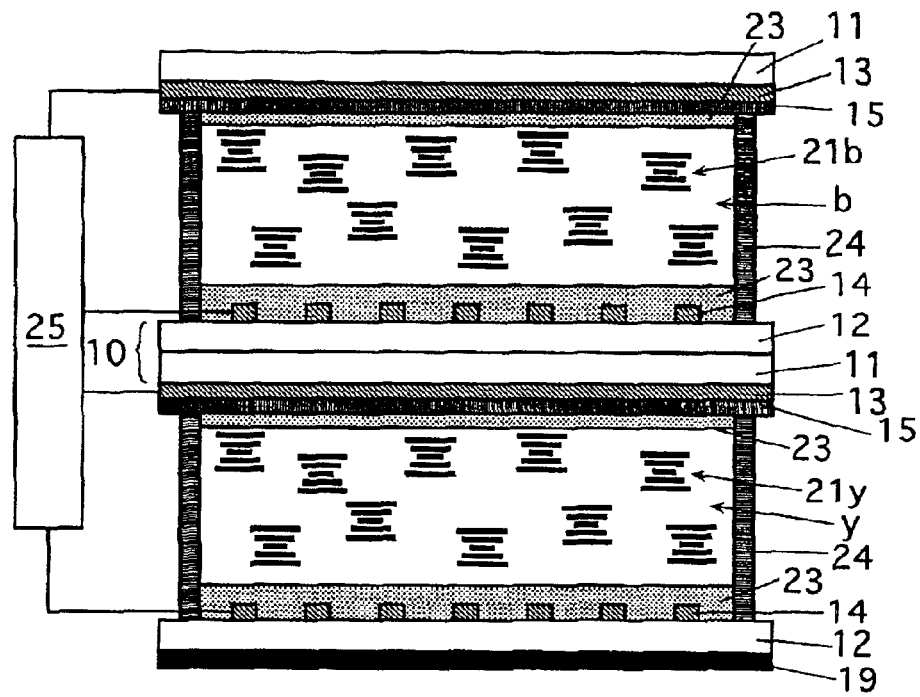
FIG. 2 is a schematic cross section of the liquid crystal display apparatus shown in FIG. 1(A) and not including columnar structures in a display region.

FIG. 2 is a schematic view showing a sectional structure (planar state) of another example of the liquid crystal display apparatus according to the invention.

The liquid crystal display apparatus of the reflection type shown in FIG. 2 is substantially the same as the liquid crystal display apparatus shown in FIG. 1(A) except for that the columnar structure is not arranged in the display region of the liquid crystal display apparatus. In the liquid crystal display apparatus shown in FIG. 2, portions having substantially the same structures and operations as those of the liquid crystal display apparatus in FIG. 1(A) bear the same reference numbers.

Figure 3:
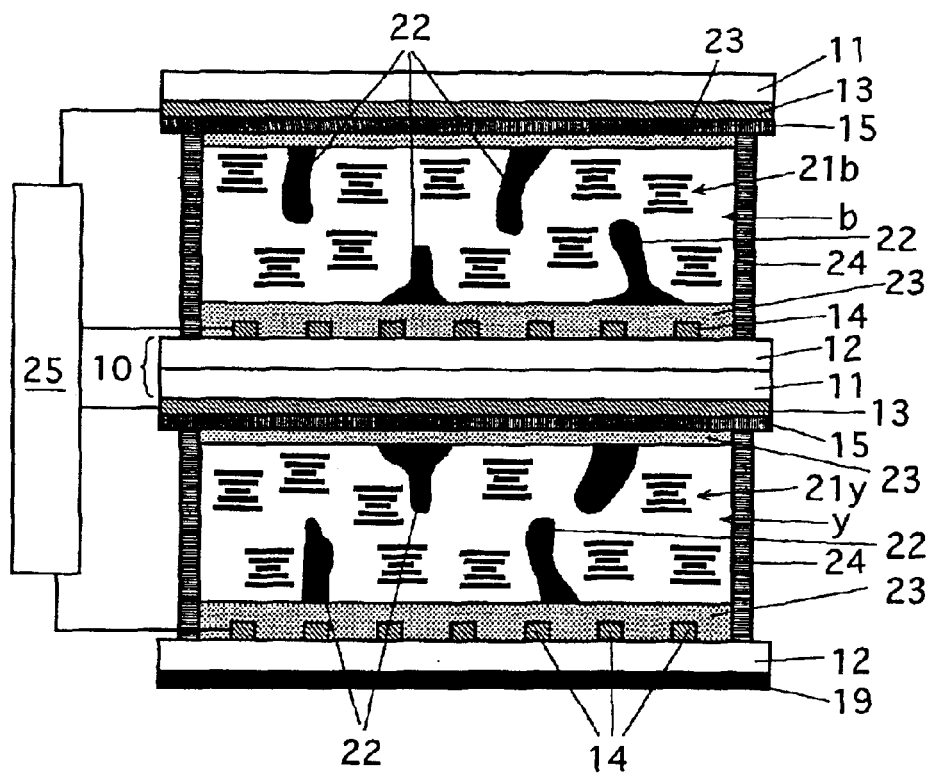
FIG. 3 is a schematic cross section of the liquid crystal display apparatus shown in FIG. 1(A) and including columnar structures of another form in the display region.

FIG. 3 schematically shows a sectional structure of still another example of the liquid crystal display apparatus of the reflection type according to the invention.

The liquid crystal display apparatus shown in FIG. 3 corresponds to the liquid crystal display apparatus shown in FIG. 1(A), and uses columnar structures 22 formed in the screen printing method. Portions having substantially the same structures and operations as those of the liquid crystal display apparatus in FIG. 1(A) bear the same reference numbers.

Figure 4:
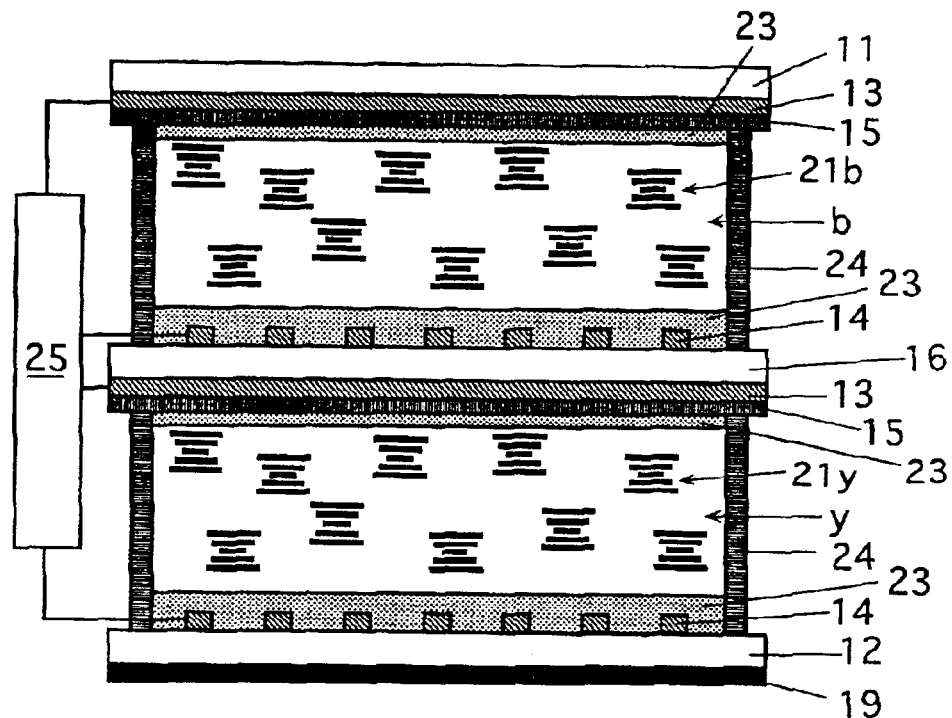
FIG. 4 is a schematic cross section of the liquid crystal display apparatus shown in FIG. 2 and using one transparent substrate having transparent electrodes on its opposite sides as an intermediate substrate located between two liquid crystal layers.

FIG. 4 shows a sectional structure (planar state) of yet another example of the liquid crystal display apparatus of the reflection type according to the invention.

The liquid crystal display apparatus shown in FIG. 4 is used for monochrome display, and has substantially the same structures as those shown in FIG. 2 except for that one substrate 16 having transparent electrodes on its opposite surfaces is used as the intermediate substrate between the two liquid crystal layers. In FIG. 4, members having substantially the same structures and operations as those of the apparatus in FIG. 2 bear the same reference numbers.

Figure 5:
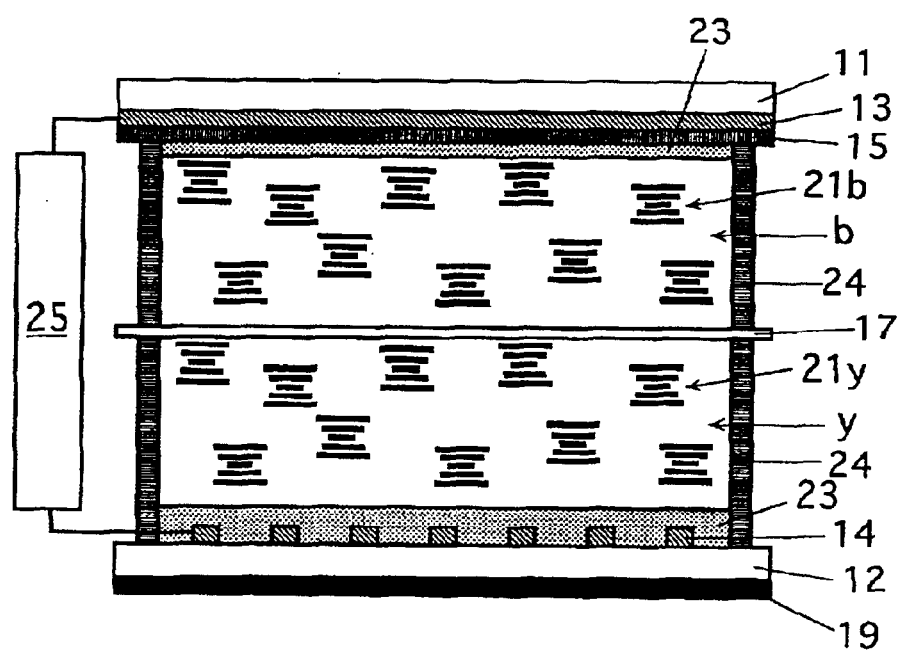
FIG. 5 is a schematic cross section of the liquid crystal display apparatus shown in FIG. 2 and using an intermediate transparent substrate not having an electrode between two liquid crystal layers.

FIG. 5 shows a sectional structure (planar state) of further another example of the liquid crystal display apparatus of the reflection type according to the invention.

The liquid crystal display apparatus shown in FIG. 5 is used for monochrome display, and has substantially the same structures as those shown in FIG. 2 except for that a transparent resin substrate 17 not having an electrode is interposed between the two liquid crystal layers. In FIG. 5, members having substantially the same structures and operations as those of the apparatus in FIG. 2 bear the same reference numbers.

Figure 6:
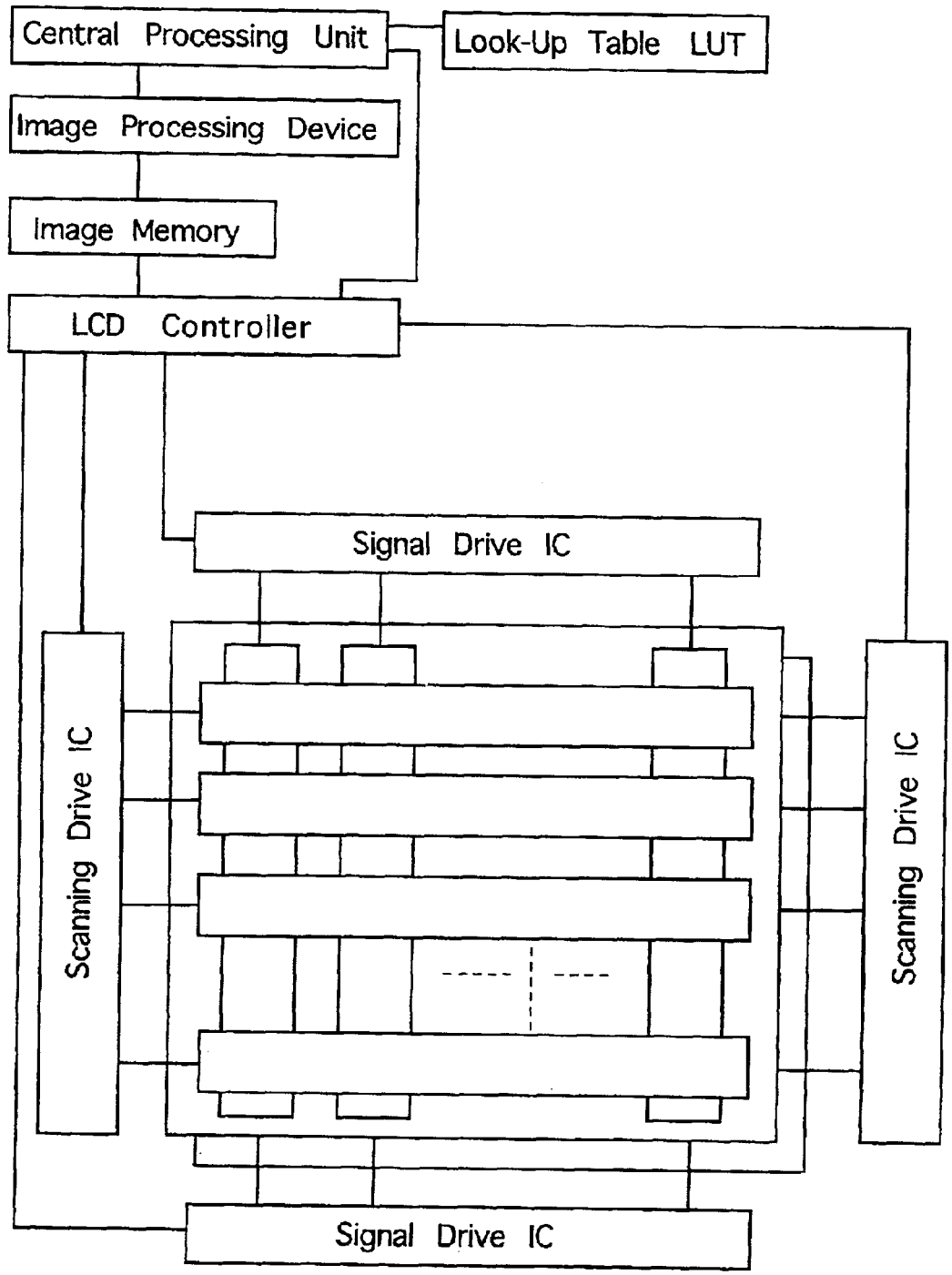
FIG. 6 is a block diagram showing an example of a drive circuit forming a major portion of a drive device for applying drive voltages to the liquid crystal layers.

FIG. 6 is a block diagram showing an example of a drive circuit, which is a major portion of the drive device 25. Each of the liquid crystal display apparatuses shown in FIGS. 1(A)–4 is driven by the drive circuit of the structure shown in FIG. 6.

The drive circuit shown in FIG. 6 has a Central Processing Unit (CPU) for controlling the whole apparatus, an image processing device for effecting various kinds of processing on image data, an image memory for storing the image data and an LCD controller for controlling drive ICs. For each liquid crystal layer, the drive circuit includes a signal drive IC for applying a voltage to each of signal electrodes (e.g., transparent electrodes 14), and a scanning drive IC for applying a voltage to each of scanning electrodes (e.g., transparent electrodes 13). The drive circuit further includes a Look-Up Table (LUT) for storing a relationship between a magnitude (voltage value and/or pulse width) of the drive voltage and a peak reflectance.

The LCD controller drives each drive IC while referring to the image memory and the LUT in accordance with instructions applied from the CPU. The LUT has stored a conversion table of the voltage value with respect to the image data based on the relationship between the magnitude (voltage value and/or pulse width) of the drive voltage and the peak reflectance, which were measured in advance. Thereby, a drive voltage is applied to each liquid crystal layer such that the peak reflectances of the respective liquid crystal layers may be substantially equal to each other, or a ratio between the peak reflectances thereof may be substantially constant.

In general, the substantially equal peak reflectances can achieve good white display. However, the peak reflectance ratio achieving good white display may be determined with consideration given to actual color characteristics, and may be achieved by controlling the drive voltages of the layers.

The peak reflectance ratio with respect to the voltages applied to liquid crystal layers may be substantially constant even when the state changes from the state of the lowest reflectance to the state of the highest reflectance. In this case, the LUT may be eliminated, and the drive voltages of the two liquid crystal layers can be controlled by multiplying at least one of them by a predetermined coefficient.

Figure 7:
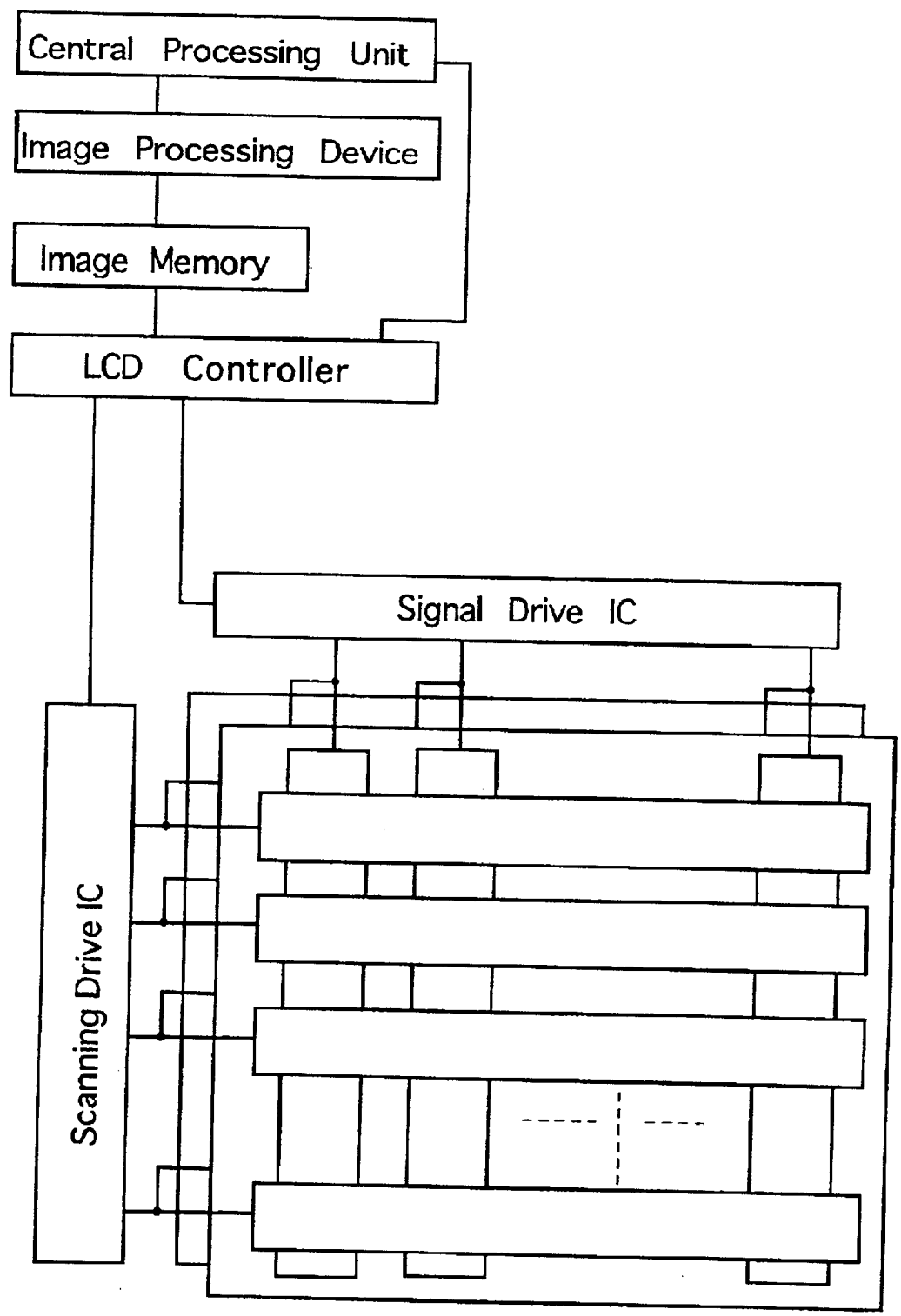
FIG. 7 is a block diagram of another example of a drive circuit forming a major portion of the drive device for applying the drive voltages to the liquid crystal layers.

FIG. 7 is a block diagram of another example of the drive circuit (a major portion of the drive device 25), which can be also applied to the liquid crystal display apparatus shown in FIG. 5 as well as the liquid crystal apparatuses shown in FIGS. 1(A)–4.

In the drive circuit shown in FIG. 7, the signal electrodes of each liquid crystal layer are connected to the single signal drive IC, and the signal electrodes of each liquid crystal layer can be electrically common to each other. The scanning electrodes of each liquid crystal layer are connected to the single scanning drive IC, and the scanning electrodes of each liquid crystal layer can be electrically common to each other. Thereby, a substantially equal drive voltage is applied to each of the liquid crystal layers in the same pixel.

The drive voltages for the two liquid crystal layers can be close to each other to a certain extent if kinds of the liquid crystal material and chiral material, a mixing ratio between them, thicknesses of the liquid crystal layers, thicknesses and kinds of the orientation film and insulating film and/or the others are appropriately selected. If the drive voltages of the two liquid crystal layers are substantially equal to each other, drive voltages applied in the same pixel can be substantially equal to each other. This simplifies the drive circuit. Further, each liquid crystal layer can be driven without arranging the electrode on the substrate located between the liquid crystal layers, as is done in the liquid crystal display apparatus shown in FIG. 5.

Only the scanning electrodes or the signal electrodes may be configured to be common to the respective liquid crystal layers. In any one of the above structures, the liquid crystal layers may be configured to have substantially equal peak reflectances, or may be configured to have a substantially constant peak reflectance ratio.

The invention is not restricted to the liquid crystal display apparatuses shown in FIG. 1(A)–FIG. 5, but can be applied to any structure, in which a difference in a range from 100 nm to 150 nm is present between the selective reflection wavelengths λ1 and λ2 of the two kinds of liquid crystal included in two liquid crystal layers layered together.

Experiments for evaluating performances of liquid crystal display apparatuses were performed. These experiments as well as experiments for comparison will now be described, although the invention is not restricted to the apparatuses used in the experiments.

In the respective experimental examples described below, the refractive index anisotropy of the nematic liquid crystal component was measured by an Abbe refractometer at 25° C.

Luminous reflectances (Y-values) and chromaticities (x, y) were measured with a spectrocolorimeter CM-3700d (manufactured by Minolta Co., Ltd.) having a white light source.

EXPERIMENTAL EXAMPLE 1

Chiral nematic liquid crystal compositions A1 and B1 were prepared. The composition A1 was prepared by adding 26 wt % of chiral material S-811 (manufactured by Merck & Co) to nematic liquid crystal A (dielectric constant anisotropy $\Delta\epsilon$: 17.3, refractive index anisotropy $\Delta n$: 0.29, nematic-isotropic phase transition temperature $T_{NI}$: 113° C.). The composition B1 was prepared by adding 30 wt % of chiral material S-811 to nematic liquid crystal B ($\Delta\epsilon$: 34.2, $\Delta n$: 0.20, $T_{NI}$: 100° C.). These chiral nematic liquid crystal compositions A1 and B1 exhibited the cholesteric phase at a room temperature, and also exhibited selective reflection characteristics having peak reflective wavelengths around 640 nm and 490 nm, respectively. These chiral nematic liquid crystal compositions A1 and B1 had anisotropy values $\Delta n$ of 0.22 and 0.16, respectively.

One of the substrates was formed of a PC (polycarbonate) film, on which transparent electrodes of ITO (indium tin oxide) were formed, and also included an orientation stabilizing film AL-4552 (manufactured by JSR Corp.) of 800 Å in thickness formed on the electrodes and spacers (manufactured by Sekisui Fine Chemical Co., Ltd.) of 5 μm in diameter dispersed on the orientation stabilizing film.

The other substrate was likewise formed of a PC (polycarbonate) film, on which transparent electrodes of ITO were formed, and also included an orientation stabilizing film AL-4552 (manufactured by JSR Corp.) of 800 Å in thickness formed on the electrodes.

A sealing material XN21S (manufactured by Mitsui Chemicals Co., Ltd.) was applied to the peripheral portion of the first substrate by screen printing to form a wall of a predetermined height, and was solidified after joining the substrates. In this manner, two sets of the substrate pairs were prepared.

Then, predetermined amounts of chiral nematic liquid crystal compositions A1 and B1 were supplied into the two sets of the substrate pairs by a vacuum supply device, respectively, to form liquid crystal cells.

These cells were layered with an adhesive sheet to provide a liquid crystal display apparatus.

A black light absorbing film was arranged on a rear surface (opposite to the light incident surface, and thus an outer surface of the liquid crystal cell having the composition A1) of the liquid crystal display apparatus.

Voltages were applied across the electrodes of the liquid crystal display apparatus, and the Y-value and chromaticity in the colored state (planar state) were measured. Predetermined pulse voltages (A1: 35V, 5 ms, B1: 45V, 5 ms) were applied for changing these liquid crystal cells to the colored state. Thereby, the liquid crystal display apparatus exhibited a white appearance with a chromaticity (x, y)=(0.33, 0.32) and a Y-value of 15.1.

EXPERIMENTAL EXAMPLE 2

Chiral nematic liquid crystal compositions C1 and B2 were prepared. The composition C1 was prepared by adding 28 wt % of chiral material S-811 (manufactured by Merck & Co) to nematic liquid crystal C (dielectric constant anisotropy $\Delta\epsilon$: 38.7, refractive index anisotropy $\Delta n$: 0.21, nematic-isotropic phase transition temperature $T_{NI}$: 119° C.). The composition B2 was prepared by adding 32 wt % of chiral material S-811 to nematic liquid crystal B ($\Delta\epsilon$: 34.2, $\Delta n$: 0.20, $T_{NI}$: 100° C.). These chiral nematic liquid crystal compositions C1 and B2 exhibited the cholesteric phase at a room temperature, and also exhibited selective reflection characteristics having peak reflective wavelengths around 550 nm and 450 nm, respectively. These chiral nematic liquid crystal compositions C1 and B2 had anisotropy values $\Delta n$ of 0.17 and 0.15, respectively.

One of the substrates was formed of a PC (polycarbonate) film, on which transparent electrodes of ITO (indium tin oxide) were formed, and also included an orientation stabilizing film AL-4552 (manufactured by JSR Corp.) of 800 Å in thickness formed on the electrodes and spacers (manufactured by Sekisui Fine Chemical Co., Ltd.) of 5 μm in diameter dispersed on the orientation stabilizing film.

The other substrate was likewise formed of a PC (polycarbonate) film, on which transparent electrodes of ITO were formed, and also included an orientation stabilizing film AL-4552 (manufactured by JSR Corp.) of 800 Å in thickness formed on the electrodes.

Sealing material XN21S (manufactured by Mitsui Chemicals Co., Ltd.) was applied to the peripheral portion of the first substrate by screen printing to form a wall of a predetermined height, and was solidified after joining the substrates. In this manner, two sets of the substrate pairs were prepared.

Then, predetermined amounts of chiral nematic liquid crystal compositions C1 and B2 were supplied into the two sets of the substrate pairs by a vacuum supply device, respectively, to form liquid crystal cells.

These cells were layered with an adhesive sheet to provide a liquid crystal display apparatus.

A black light absorbing film was arranged on a rear surface (opposite to the light incident surface, and thus an outer surface of the liquid crystal cell having the composition C1) of the liquid crystal display apparatus.

Voltages were applied across the electrodes of the liquid crystal display apparatus, and the Y-value and chromaticity in the colored state (planar state) were measured. Predetermined pulse voltages (C1: 40V, 5 ms, B2: 40V, 5 ms) were applied for changing these liquid crystal cells to the colored state. Thereby, the liquid crystal display apparatus exhibited a white appearance with a chromaticity (x, y)=(0.25, 0.32) and a Y-value of 18.7.

EXPERIMENTAL EXAMPLE 3

Chiral nematic liquid crystal compositions C2 and C3 were prepared. The composition C2 was prepared by adding 16 wt % of a two-to-one (2:1) mixture of chiral material CB15 (manufactured by Merck & Co) and a chiral material expressed by a structural formula (1) to the nematic liquid crystal C (dielectric constant anisotropy Δε: 38.7, refractive index anisotropy Δn: 0.21, nematic-isotropic phase transition temperature $T_{NI}$: 119° C.). The composition C3 was prepared by 19 wt % of the same mixture to the nematic liquid crystal C. These chiral nematic liquid crystal compositions C2 and C3 exhibited the cholesteric phase at a room temperature, and also exhibited selective reflection characteristics having peak reflective wavelengths around 590 nm and 480 nm, respectively. These chiral nematic liquid crystal compositions C2 and C3 had anisotropy values Δn of 0.19 and 0.18, respectively.

& Co) to nematic liquid crystal C (dielectric constant anisotropy Δε: 38.7, refractive index anisotropy Δn: 0.21, nematic-isotropic phase transition temperature $T_{NI}$: 119° C.). The composition B3 was prepared by adding 31 wt % of chiral material S-811 to nematic liquid crystal B (Δε: 34.2, Δn: 0.20, $T_{NI}$: 100° C.). These chiral nematic liquid crystal compositions C4 and B3 exhibited the cholesteric phase at a room temperature, and also exhibited selective reflection characteristics having peak reflective wavelengths around 580 nm and 470 nm, respectively. These chiral nematic liquid crystal compositions C4 and B3 had anisotropy values Δn of 0.18 and 0.15, respectively.

One of the substrates was formed of a PC (polycarbonate) film, on which transparent electrodes of ITO (indium tin Formula (1)

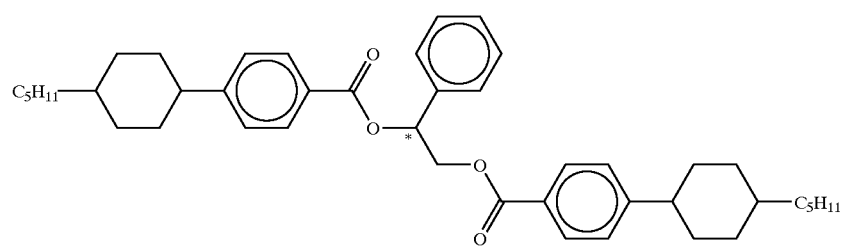

One of the substrates was formed of a PC (polycarbonate) film, on which transparent electrodes of ITO (indium tin oxide) were formed, and also included an orientation stabilizing film AL-4552 (manufactured by JSR Corp.) of 800 Å in thickness formed on the electrodes and spacers (manufactured by Sekisui Fine Chemical Co., Ltd.) of 5 μm in diameter dispersed on the orientation stabilizing film.

The other substrate was likewise formed of a PC (polycarbonate) film, on which transparent electrodes of ITO were formed, and also included an orientation stabilizing film AL-4552 (manufactured by JSR Corp.) of 800 Å in thickness formed on the transparent electrodes.

Sealing material XN21S (manufactured by Mitsui Chemicals Co., Ltd.) was applied to the peripheral portion of the first substrate by screen printing to form a wall of a predetermined height, and was solidified after joining the substrates. In this manner, two sets of the substrate pairs were prepared.

Then, predetermined amounts of chiral nematic liquid crystal compositions C2 and C3 were supplied into the two sets of the substrate pairs by a vacuum supply device, respectively, to form liquid crystal cells.

These cells were layered with an adhesive sheet to provide a liquid crystal display apparatus.

A black light absorbing film was arranged on a rear surface (opposite to the light incident surface, and thus an outer surface of the liquid crystal cell having the composition C2) of the liquid crystal display apparatus.

Voltages were applied across the electrodes of the liquid crystal display apparatus, and the Y-value and chromaticity in the colored state (planar state) were measured. Predetermined pulse voltages (C2: 40V, 5 ms, C3: 40V, 5 ms) were applied for changing these liquid crystal cells to the colored state. Thereby, the liquid crystal display apparatus exhibited a white appearance with a chromaticity (x, y)=(0.31, 0.32) and a Y-value of 22.6.

EXPERIMENTAL EXAMPLE 4

Chiral nematic liquid crystal compositions C4 and B3 were prepared. The composition C4 was prepared by adding 27 wt % of chiral material S-811 (manufactured by Merck oxide) were formed, and also included an orientation stabilizing film AL-4552 (manufactured by JSR Corp.) of 800 Å in thickness formed on the electrodes and spacers (manufactured by Sekisui Fine Chemical Co., Ltd.) of 5 μm in diameter dispersed on the orientation stabilizing film.

The other substrate was likewise formed of a PC (polycarbonate) film, on which transparent electrodes were formed, and also included an orientation stabilizing film AL-4552 (manufactured by JSR Corp.) of 800 Å in thickness formed on the transparent electrodes.

Sealing material XN21S (manufactured by Mitsui Chemicals Co., Ltd.) was applied to the peripheral portion of each substrate by screen printing to form a wall of a predetermined height. Then, predetermined amounts of chiral nematic liquid crystal compositions C4 and B3 were applied to the substrates, respectively. These amounts were calculated from the height of the sealing material and an area surrounded by the sealing material. Then, the substrates were overlaid so that the electrode formation surfaces were opposed to each other with a PET substrate of 6 μm in thickness therebetween. Thereafter, the sealing material was solidified to form a liquid crystal display apparatus including two liquid crystal cells.

A black light absorbing film was arranged on a rear surface (opposite to the light incident surface, and thus an outer surface of the liquid crystal cell having the composition C4) of the liquid crystal display apparatus.

Voltages were applied across the electrodes of the liquid crystal display apparatus, and the Y-value and chromaticity in the colored state (planar state) were measured. Predetermined pulse voltages (120V, 5 ms) were applied for changing these liquid crystal cells to the colored state. Thereby, the liquid crystal display apparatus exhibited a white appearance with a chromaticity (x, y)=(0.31, 0.31) and a Y-value of 18.7.

EXPERIMENTAL EXAMPLE 5

Chiral nematic liquid crystal compositions C5 and B2 were prepared. The composition C5 was prepared by adding 26 wt % of chiral material S-811 (manufactured by Merck & Co) to nematic liquid crystal C (dielectric constant anisotropy Δε: 38.7, refractive index anisotropy Δn: 0.21, nematic-isotropic phase transition temperature $T_{NI}$: 119° C.). The composition B2 was prepared by adding 32 wt % of chiral material S-811 to nematic liquid crystal B ($\Delta\epsilon$: 34.2, $\Delta n$: 0.20, $T_{NI}$: 100° C.). These chiral nematic liquid crystal compositions C5 and B2 exhibited the cholesteric phase at a room temperature, and also exhibited selective reflection characteristics having peak reflective wavelengths around 570 nm and 450 nm, respectively. These chiral nematic liquid crystal compositions C5 and B2 had anisotropy values $\Delta n$ of 0.18 and 0.15, respectively.

One of the substrates was formed of a PES (polyether sulfone) film, on which transparent electrodes of ITO (indium tin oxide) were formed, and also included an orientation stabilizing film AL-4552 (manufactured by JSR Corp.) of 800 Å in thickness formed on the electrodes and spacers (manufactured by Sekisui Fine Chemical Co., Ltd.) of 5 $\mu$m, in diameter dispersed on the orientation stabilizing film.

The other substrate was likewise formed of a PES film, on which transparent electrodes were formed, and also included an orientation stabilizing film AL-4552 (manufactured by JSR Corp.) of 800 Å in thickness formed on the transparent electrodes.

Sealing material XN21S (manufactured by Mitsui Chemicals Co., Ltd.) was applied to the peripheral portion of each substrate by screen printing to form a wall of a predetermined height. Then, predetermined amounts of chiral nematic liquid crystal compositions C5 and B2 were applied to the substrates, respectively. These amounts were calculated from the height of the sealing material and an area surrounded by the sealing material. Then, the substrates were overlaid so that the electrode formation surfaces were opposed to each other with a PC substrate of 100 $\mu$m in thickness therebetween. This PC substrate was provided on its opposite surfaces with the transparent electrodes. Thereafter, the sealing material was solidified to form a liquid crystal display apparatus including two liquid crystal cells.

A black light absorbing film was arranged on a rear surface (opposite to the light incident surface, and thus an outer surface of the liquid crystal cell having the composition C5) of the liquid crystal display apparatus.

Voltages were applied across the electrodes of the liquid crystal display apparatus, and the Y-value and chromaticity in the colored state (planar state) were measured. Predetermined pulse voltages (C5: 40V, 5 ms, B2: 40V, 5 ms) were applied for changing these liquid crystal cells to the colored state. Thereby, the liquid crystal display apparatus exhibited a white appearance with a chromaticity (x, y)=(0.30, 0.30) and a Y-value of 18.3.

EXPERIMENTAL EXAMPLE 6

Chiral nematic liquid crystal compositions D1 and D2 were prepared. The composition D1 was prepared by adding 27 wt % of chiral material S-811 (manufactured by Merck & Co) to nematic liquid crystal D (dielectric constant anisotropy $\Delta\epsilon$: 31.5, refractive index anisotropy $\Delta n$: 0.22, nematic-isotropic phase transition temperature $T_{NI}$: 110° C.). The composition D2 was prepared by adding 34 wt % of chiral material S-811 to the nematic liquid crystal D. These chiral nematic liquid crystal compositions D1 and D2 exhibited the cholesteric phase at a room temperature, and also exhibited selective reflection characteristics having peak reflective wavelengths around 600 nm and 480 nm, respectively. These chiral nematic liquid crystal compositions D1 and D2 had anisotropy values $\Delta n$ of 0.17 and 0.16, respectively.

One of the substrates was formed of a PES (polyether sulfone) film, on which transparent electrodes of ITO (indium tin oxide) were formed, and also included an orientation stabilizing film AL-4552 (manufactured by JSR Corp.) of 800 Å in thickness formed on the electrodes and spacers (manufactured by Sekisui Fine Chemical Co., Ltd.) of 5 $\mu$m in diameter dispersed on the orientation stabilizing film.

The other substrate was likewise formed of a PES film, on which transparent electrodes of ITO were formed, and also included an orientation stabilizing film AL-4552 (manufactured by JSR Corp.) of 800 Å in thickness formed on the transparent electrodes.

Then, columnar structures of epoxy resin having a height of 5 $\mu$m were formed on the second substrate by screen printing. Sealing material XN21S (manufactured by Mitsui Chemicals Co., Ltd.) was applied to the peripheral portion thereof by screen printing to form a wall of a predetermined height. Then, the substrates were overlaid, and the sealing material was solidified. In this manner, two sets of the substrate pairs were prepared.

Then, predetermined amounts of chiral nematic liquid crystal compositions D1 and D2 were supplied into the two sets of the substrate pairs by a vacuum supply device, respectively, to form two liquid crystal display cells.

These cells were layered with an adhesive sheet to provide a liquid crystal display apparatus.

A black light absorbing film was arranged on a rear surface (opposite to the light incident surface, and thus an outer surface of the liquid crystal cell having the composition D1) of the liquid crystal display apparatus.

Voltages were applied across the electrodes of the liquid crystal display apparatus, and the Y-value and chromaticity in the colored state (planar state) were measured. Predetermined pulse voltages (D1: 35V, 5 ms, D2: 40V, 5 ms) were applied for changing these liquid crystal cells to the colored state. Thereby, the liquid crystal display apparatus exhibited a white appearance with a chromaticity (x, y)=(0.34, 0.32) and a Y-value of 19.0. The peak reflectances around 600 nm and 480 nm were both equal to 27%. Also, predetermined pulse voltages (D1: 30V, 5 ms, D2: 35V, 5 ms) were applied. Thereby, the liquid crystal display apparatus exhibited a gray appearance with a chromaticity (x, y)=(0.33, 0.32) and a Y-value of 11.2. The peak reflectances around 600 nm and 480 nm were both equal to 13%.

EXPERIMENTAL EXAMPLE 7

Chiral nematic liquid crystal compositions D3 and E1 were prepared. The composition D3 was prepared by adding 16 wt % of a two-to-one (2:1) mixture of chiral material CB15 (manufactured by Merck & Co) and a chiral material expressed by the structural formula (1) to nematic liquid crystal D (dielectric constant anisotropy $\Delta\epsilon$: 31.5, refractive index anisotropy $\Delta n$: 0.22, nematic-isotropic phase transition temperature $T_{NI}$: 110° C.). The composition E1 was prepared by adding 19 wt % of the same mixture to nematic liquid crystal E (dielectric constant anisotropy $\Delta\epsilon$: 35.8, refractive index anisotropy $\Delta n$: 0.24, nematic-isotropic phase transition temperature $T_{NI}$: 950° C.). These chiral nematic liquid crystal compositions D3 and E1 exhibited the cholesteric phase at a room temperature, and also exhibited selective reflection characteristics having peak reflective wavelengths around 590 nm and 470 nm, respectively. These chiral nematic liquid crystal compositions D3 and E1 had anisotropy values $\Delta n$ of 0.18 and 0.17, respectively.

One of the substrates was formed of a glass substrate, on which transparent electrodes of ITO (indium tin oxide) were formed, and also included an orientation stabilizing film AL-4552 (manufactured by JSR Corp.) of 400 Å in thickness formed on the electrodes and spacers (manufactured by Sekisui Fine Chemical Co., Ltd.) of 5 $\mu$m in diameter dispersed on the orientation stabilizing film.

The other substrate was likewise formed of a glass substrate, on which transparent electrodes of ITO were formed, and also included an orientation stabilizing film AL-4552 (manufactured by JSR Corp.) of 400 Å in thickness formed on the transparent electrodes.

Sealing material XN21S (manufactured by Mitsui Chemicals Co., Ltd.) was applied to the peripheral portion of the first substrate by screen printing to form a wall of a predetermined height, and was solidified after joining the substrates. In this manner, two sets of the substrate pairs were prepared.

Then, predetermined amounts of chiral nematic liquid crystal compositions D3 and E1 were supplied into the two sets of the substrate pairs by a vacuum supply device, respectively, to form two liquid crystal cells.

These cells were layered with an adhesive sheet to provide a liquid crystal display apparatus.

A black light absorbing film was arranged on a rear surface (opposite to the light incident surface, and thus an outer surface of the liquid crystal cell having the composition D3) of the liquid crystal display apparatus.

Voltages were applied across the electrodes of the liquid crystal display apparatus, and the Y-value and chromaticity in the colored state (planar state) were measured. Predetermined pulse voltages (D3: 40V, 5 ms, E1: 40V, 5 ms) were applied for changing these liquid crystal cells to the colored state. Thereby, the liquid crystal display apparatus exhibited a white appearance with a chromaticity (x, y)=(0.33, 0.31) and a Y-value of 20.0.

COMPARATIVE EXPERIMENTAL EXAMPLE 1

Chiral nematic liquid crystal compositions C1 and B1 were prepared. The composition C1 was prepared by adding 28 wt % of chiral material S-811 (manufactured by Merck & Co) to nematic liquid crystal C (dielectric constant anisotropy $\Delta\epsilon$: 38.7, refractive index anisotropy $\Delta n$: 0.21, nematic-isotropic phase transition temperature $T_{NI}$: 119° C.). The composition B1 was prepared by adding 30 wt % of chiral material S-811 to nematic liquid crystal B ($\Delta\epsilon$: 34.2, $\Delta n$: 0.20, $T_{NI}$: 100° C.). These chiral nematic liquid crystal compositions C1 and B1 exhibited the cholesteric phase at a room temperature, and also exhibited selective reflection characteristics having peak reflective wavelengths around 550 nm and 490 nm, respectively. These chiral nematic liquid crystal compositions C1 and B1 had anisotropy values $\Delta n$ of 0.17 and 0.16, respectively.

One of the substrates was formed of a PC (polycarbonate) film, on which transparent electrodes of ITO (indium tin oxide) were formed, and also included an orientation stabilizing film AL-4552 (manufactured by JSR Corp.) of 800 Å in thickness formed on the electrodes and spacers (manufactured by Sekisui Fine Chemical Co., Ltd.) of 5 μm in diameter dispersed on the orientation stabilizing film.

The other substrate was likewise formed of a PC (polycarbonate) film, on which transparent electrodes of ITO were formed, and also included an orientation stabilizing film AL-4552 (manufactured by JSR Corp.) of 800 Å in thickness formed on the transparent electrodes.

A sealing material XN21S (manufactured by Mitsui Chemicals Co., Ltd.) was applied to the peripheral portion of the first substrate by screen printing to form a wall of a predetermined height, and was solidified after joining the substrates. In this manner, two sets of the substrate pairs were prepared.

Then, predetermined amounts of chiral nematic liquid crystal compositions C1 and B1 were supplied into the two sets of the substrate pairs by a vacuum supply device, respectively, to form two liquid crystal cells.

These cells were layered with an adhesive sheet to provide a liquid crystal display apparatus.

A black light absorbing film was arranged on a rear surface (opposite to the light incident surface, and thus an outer surface of the liquid crystal cell having the composition C1) of the liquid crystal display apparatus.

Voltages were applied across the electrodes of the liquid crystal display apparatus, and the Y-value and chromaticity in the colored state (planar state) were measured. Predetermined pulse voltages (C1: 45V, 5 ms, B1: 35V, 5 ms) were applied for changing these liquid crystal cells to the colored state. Thereby, the liquid crystal display apparatus exhibited a green appearance with a chromaticity (x, y)=(0.25, 0.42) and a Y-value of 23.0.

COMPARATIVE EXPERIMENTAL EXAMPLE 2

Chiral nematic liquid crystal compositions C6 and B3 were prepared. The composition C6 was prepared by adding 24 wt % of chiral material S-811 (manufactured by Merck & Co) to nematic liquid crystal C (dielectric constant anisotropy $\Delta\epsilon$: 38.7, refractive index anisotropy $\Delta n$: 0.21, nematic-isotropic phase transition temperature $T_{NI}$: 119° C.). The composition B3 was prepared by adding 31 wt % of chiral material S-811 to nematic liquid crystal B ($\Delta\epsilon$: 34.2, $\Delta n$: 0.20, $T_{NI}$: 100° C.). These chiral nematic liquid crystal compositions C6 and B3 exhibited the cholesteric phase at a room temperature, and also exhibited selective reflection characteristics having peak reflective wavelengths around 660 nm and 470 nm, respectively. These chiral nematic liquid crystal compositions C6 and B3 had anisotropy values $\Delta n$ of 0.19 and 0.15, respectively.

One of the substrates was formed of a PC (polycarbonate) film, on which transparent electrodes of TIO (indium tin oxide) were formed, and also included an orientation stabilizing film AL-4552 (manufactured by JSR Corp.) of 800 Å in thickness formed on the electrodes and spacers (manufactured by Sekisui Fine Chemical Co., Ltd.) of 5 μm in diameter dispersed on the orientation stabilizing film.

The other substrate was likewise formed of a PC (polycarbonate) film, on which transparent electrodes of ITO were formed, and also included an orientation stabilizing film AL-4552 (manufactured by JSR Corp.) of 800 Å in thickness formed on the transparent electrodes.

A sealing material XN21S (manufactured by Mitsui Chemicals Co., Ltd.) was applied to the peripheral portion of the first substrate by screen printing to form a wall of a predetermined height, and was solidified after joining the substrates. In this manner, two sets of the substrate pairs were prepared.

Then, predetermined amounts of chiral nematic liquid crystal compositions C6 and B3 were supplied into the two sets of the substrate pairs by a vacuum supply device, respectively, to form two liquid crystal cells.

These cells were layered with an adhesive sheet to provide a liquid crystal display apparatus.

A black light absorbing film was arranged on a rear surface (opposite to the light incident surface, and thus an outer surface of the liquid crystal cell having the composition C6) of the liquid crystal display apparatus.

Voltages were applied across the electrodes of the liquid crystal display apparatus, and the Y-value and chromaticity in the colored state (planar state) were measured. Predetermined pulse voltages (C6: 45V, 5 ms, B3: 35V, 5 ms) were applied for changing these liquid crystal cells to the colored state. Thereby, the liquid crystal display apparatus exhibited a purple appearance with a chromaticity (x, y)=(0.28, 0.21) and a Y-value of 8.9.

COMPARATIVE EXPERIMENTAL EXAMPLE 3

Chiral nematic liquid crystal compositions A1 and C1 were prepared. The composition A1 was prepared by adding 26 wt % of chiral material S-811 (manufactured by Merck & Co) to nematic liquid crystal A (dielectric constant anisotropy $\Delta\epsilon$: 17.3, refractive index anisotropy $\Delta n$: 0.29, nematic-isotropic phase transition temperature $T_{NI}$: 113° C.). The composition C1 was prepared by adding 28 wt % of chiral material S-811 to nematic liquid crystal C ($\Delta\epsilon$: 38.7, $\Delta n$: 0.21, $T_{NI}$: 119° C.). These chiral nematic liquid crystal compositions A1 and C1 exhibited the cholesteric phase at a room temperature, and also exhibited selective reflection characteristics having peak reflective wavelengths around 640 nm and 550 nm, respectively. These chiral nematic liquid crystal compositions A1 and C1 had anisotropy values $\Delta n$ of 0.22 and 0.17, respectively.

One of the substrates was formed of a PC (polycarbonate) film, on which transparent electrodes of ITO(indium tin oxide) were formed, and also included an orientation stabilizing film AL-4552 (manufactured by JSR Corp.) of 800 Å in thickness formed on the electrodes and spacers (manufactured by Sekisui Fine Chemical Co., Ltd.) of 5 μm in diameter dispersed on the orientation stabilizing film.

The other substrate was likewise formed of a PC (polycarbonate) film, on which transparent electrodes of ITO were formed, and also included an orientation stabilizing film AL-4552 (manufactured by JSR Corp.) of 800 Å in thickness formed on the transparent electrodes.

A sealing material XN21S (manufactured by Mitsui Chemicals Co.,. Ltd.) was applied to the peripheral portion of the first substrate by screen printing to form a wall of a predetermined height, and was solidified after joining the substrates. In this manner, two sets of the substrate pairs were prepared.

Then, predetermined amounts of chiral nematic liquid crystal compositions A1 and C1 were supplied into the two sets of the substrate pairs by a vacuum supply device, respectively, to form two liquid crystal cells.

These cells were layered with an adhesive sheet to provide a liquid crystal display apparatus.

A black light absorbing film was arranged on a rear surface (opposite to the light incident surface, and thus an outer surface of the liquid crystal cell having the composition A1) of the liquid crystal display apparatus.

Voltages were applied across the electrodes of the liquid crystal display apparatus, and the Y-value and chromaticity in the colored state (planar state) were measured. Predetermined pulse voltages (A1: 35V, 5 ms, C1: 40V, 5 ms) were applied for changing these liquid crystal cells to the colored state. Thereby, the liquid crystal display apparatus exhibited a yellow green appearance with a chromaticity (x, y)=(0.41, 0.47) and a Y-value of 24.1.

Conditions of the experimental examples and comparative experimental examples described above as well as results of measurement are shown in the following table 1.

TABLE 1

| | LIQUID CRYSTAL | WAVELENGTH [nm] | $\Delta n$ | x,y | Y-value |
|---|---|---|---|---|---|
| E.Ex.1 | A1/B1 | 640/490 | 0.22/0.16 | 0.33, 0.32 | 15.1 |
| E.Ex.2 | C1/B2 | 550/450 | 0.17/0.15 | 0.25, 0.32 | 18.7 |
| E.Ex.3 | C2/C3 | 590/480 | 0.19/0.18 | 0.31, 0.32 | 22.6 |
| E.Ex.4 | C4/B3 | 580/470 | 0.18/0.15 | 0.31, 0.31 | 18.7 |
| E.Ex.5 | C5/B2 | 570/450 | 0.18/0.15 | 0.30, 0.30 | 18.3 |
| E.Ex.6 | D1/D2 | 600/480 | 0.17/0.16 | 0.34, 0.32 | 19.0 |
| E.Ex.7 | D3/E1 | 590/470 | 0.18/0.17 | 0.33, 0.31 | 20.0 |
| C.E.Ex.1 | C1/B1 | 550/490 | 0.17/0.16 | 0.25, 0.42 | 23.0 |
| C.E.Ex.2 | C6/B3 | 660/470 | 0.19/0.15 | 0.28, 0.21 | 8.9 |
| C.E.Ex.3 | A1/C1 | 640/550 | 0.22/0.17 | 0.41, 0.47 | 24.1 |

E.Ex.: Experimental Example
C.E.Ex.: Comparative Experimental Example

As can be seen from the above, the liquid crystal display apparatuses of the experimental examples 1–7 exhibited a white appearance. In contrast to this, the liquid crystal display apparatuses of the comparative experimental examples 1, 2 and 3 exhibited a green appearance, a purple appearance and a yellow green appearance, respectively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display apparatus having a front surface and a rear surface, the liquid crystal display apparatus comprising:
   first and second substrates;
   an intermediate transparent substrate;
   a first liquid crystal layer disposed adjacent to said front surface, including first liquid crystal exhibiting a cholesteric phase at a room temperature, and being tuned to selectively reflect light of a wavelength λ1 within a visible wavelength range; and
   a second liquid crystal layer disposed adjacent to said rear surface, including second liquid crystal exhibiting a cholesteric phase at the room temperature, and being tuned to selectively reflect light of a wavelength λ2 within the visible wavelength range,
   wherein a difference between said selective reflection wavelengths λ1 and λ2 is in a range from 100 nm to 150 nm, and said first liquid crystal layer is disposed between said first substrate and said intermediate substrate, said second liquid crystal layer is disposed between said intermediate substrate and said second substrate, and at least one of said first and second substrates is transparent and is provided with a transparent electrode, and the other of said first and second substrates is provided with an electrode.

2. The liquid crystal display apparatus according to claim 1, wherein
   said intermediate transparent substrate is an intermediate transparent substrate provided on its opposite surfaces with transparent electrodes, respectively.

3. The liquid crystal display apparatus according to claim 1, wherein
   said intermediate transparent substrate is an intermediate transparent substrate formed of layered transparent substrate portions, each being provided on one of its surfaces with a transparent electrode, and having the other surface attached to the other substrate portion.

4. The liquid crystal display apparatus according to claim 1, wherein
   said intermediate transparent substrate is an intermediate transparent substrate not provided with an electrode.

5. The liquid crystal display apparatus according to claim 1, wherein
   at least one of said first and second substrates is a resin substrate.

6. The liquid crystal display apparatus according to claim 1, wherein
said intermediate transparent substrate is a resin substrate.

7. The liquid crystal display apparatus according to claim 1, wherein
at least one of said first and second substrates has an orientation stabilizing film in contact with one of the liquid crystal layers, and at least one surface of said intermediate substrate has an orientation stabilizing film in contact with one of the liquid crystal layers.

8. The liquid crystal display apparatus according to claim 1, wherein
said transparent intermediate substrate comprises a pair of transparent substrates joined together.

9. The liquid crystal display apparatus according to claim 8, further comprising:
transparent electrodes disposed on the unjoined sides of said pair of transparent substrates.

10. A liquid crystal display apparatus comprising:
a first substrate disposed adjacent to a viewing surface of said liquid crystal display apparatus;
a first liquid crystal material disposed adjacent to said first substrate, said first liquid crystal material having a peak reflectance at a first wavelength;
a second substrate disposed adjacent to a rear surface of said liquid crystal display apparatus;
a second liquid crystal material disposed adjacent to said second substrate, said second liquid crystal material having a peak reflectance at a second wavelength; and
a third substrate disposed between the first and second liquid crystal materials,
wherein each of said first and second liquid crystal materials have a refractive index anisotropy of not less than about 0.15, and
wherein a difference between said first and second wavelengths is not less than about 100 nm and not more than about 150 nm.

11. The liquid crystal display apparatus according to claim 10, further comprising:
a first electrode disposed on the first substrate; and
a second electrode disposed on the second substrate so that, the first and second liquid crystal materials are between said first and second electrodes.

12. The liquid crystal display apparatus according to claim 11, further comprising:
driver circuitry coupled to the first and second electrodes, the driver circuitry providing a voltage across the first and second liquid crystal materials.

13. The liquid crystal display apparatus according to claim 10, further comprising:
a first pair of electrodes disposed on said first and third substrates so that the first liquid crystal material is between the first pair of electrodes; and
a second pair of electrodes disposed on said second and third substrates so that said second liquid crystal material is between the second pair of electrodes.

14. The liquid crystal display apparatus according to claim 13, further comprising:
driver circuitry coupled to the first and second pairs of electrodes, the driver circuitry selectively providing first and second predetermined voltages across the first and second liquid crystal materials, respectively.

15. The liquid crystal display apparatus according to claim 14, wherein:
said driver circuitry is coupled to said first and second pairs of electrodes so that said first and second pairs of electrodes are electrically parallel.

16. The liquid crystal display apparatus according to claim 14, wherein:
said first and second predetermined voltages are selected so that a ratio between the magnitudes of the peak reflectance of the first and second liquid crystal materials has a predetermined value.

17. The liquid crystal display apparatus according to claim 16, wherein said ratio has a value of about 1.

18. A liquid crystal display apparatus comprising:
a front substrate;
a rear substrate;
a separator disposed between said front and rear substrates;
two liquid crystals, including a first liquid crystal disposed between said front substrate and said separator, and a second liquid crystal disposed between said separator and said rear substrate, wherein
both of the liquid crystals exhibit a cholesteric phase at room temperature,
both of the liquid crystals have a refractive index anisotropy ($\Delta n$) not less than about 0.15; and
the peak reflectance wavelengths of the first and second liquid crystals are separated by between 100 nm and 150 nm.

19. A liquid crystal display apparatus having a front surface and a rear surface, the liquid crystal display apparatus comprising:
first and second substrates;
an intermediate substrate;
a first liquid crystal layer disposed adjacent to said front surface, including first liquid crystal exhibiting a cholesteric phase at a room temperature, and being tuned to selectively reflect light of a wavelength $\lambda 1$ within a visible wavelength range; and
a second liquid crystal layer disposed adjacent to said rear surface, including second liquid crystal exhibiting a cholesteric phase at the room temperature, and being tuned to selectively reflect light of a wavelength $\lambda 2$ within the visible wavelength range,
wherein:
a difference between said selective reflection wavelengths $\lambda 1$ and $\lambda 2$ is in a range from 100 nm to 150 nm,
said first liquid crystal layer is disposed between said first substrate and said intermediate substrate, and said second liquid crystal layer is disposed between said intermediate substrate and said second substrate, and
at least one of said first and second substrates is transparent and is provided with a transparent electrode, and the other of said first and second substrates is provided with an electrode.

20. A liquid crystal display apparatus having a front surface and a rear surface, the liquid crystal display apparatus comprising:
a first liquid crystal material disposed adjacent to said front surface, exhibiting a cholesteric phase at a room temperature, and being tuned to selectively reflect light of a wavelength $\lambda 1$ within a visible wavelength range;
a second liquid crystal material disposed adjacent to said rear surface, exhibiting a cholesteric phase at a room temperature, and being tuned to selectively reflect light of a wavelength $\lambda 2$ within a visible wavelength range;
first and second substrates; and
an intermediate layer; wherein a difference between said selective reflection wavelength λ1 and λ2 is in a range from 100 nm and 150 nm, and said first liquid crystal material is disposed between said first substrate and said intermediate layer, said second liquid crystal material is disposed between said intermediate layer and said second substrate, and at least one of said first and second substrates is transparent and is provided with a transparent electrode, and the other of said first and second substrates is provided with an electrode.

* * * * *